(12) United States Patent
Rao Kotha et al.

(10) Patent No.: US 10,831,545 B2
(45) Date of Patent: Nov. 10, 2020

(54) EFFICIENT QUEUEING AND SCHEDULING OF BACKUPS IN A MULTI-TENANT CLOUD COMPUTING ENVIRONMENT

(71) Applicant: VMware, Inc., Palo Alto, CA (US)

(72) Inventors: Venu Gopala Rao Kotha, Bangalore (IN); Pooja Naik, Milpitas, CA (US); Sureshbabu Koyadan Chathoth, Bangalore (IN); Sachin Thakkar, San Jose, CA (US); Debashis Basak, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 406 days.

(21) Appl. No.: 15/690,243

(22) Filed: Aug. 29, 2017

(65) Prior Publication Data

US 2018/0060182 A1   Mar. 1, 2018

Related U.S. Application Data

(60) Provisional application No. 62/380,945, filed on Aug. 29, 2016.

(51) Int. Cl.
*G06F 9/00* (2006.01)
*G06F 9/50* (2006.01)
(Continued)

(52) U.S. Cl.
CPC ........ *G06F 9/5038* (2013.01); *G06F 9/45558* (2013.01); *G06F 9/461* (2013.01);
(Continued)

(58) Field of Classification Search
CPC ............ G06F 11/1402; G06F 11/1446; G06F 11/1448; G06F 11/1451; G06F 11/1458; G06F 11/1461; G06F 11/1464; G06F 16/113; G06F 16/182; G06F 2009/45562; G06F 2009/45575; G06F 2009/45583; G06F 2009/45595; G06F 3/016; G06F 3/044; G06F 9/45558; G06F 9/461; G06F 9/4881; G06F 9/5077; G06F 2201/81;
(Continued)

(56) References Cited

U.S. PATENT DOCUMENTS 9,684,563 B1 *   6/2017   Wartnick .............. G06F 1/3212
2002/0099854 A1 *   7/2002   Jorgensen ................ H04L 1/20
                                                                            709/249
(Continued)

*Primary Examiner* — Diedra McQuitery
(74) *Attorney, Agent, or Firm* — Patterson + Sheridan, LLP

(57) ABSTRACT

Backups of workloads in a multi-tenant cloud computing environment are efficiently queued and scheduled. A method of backing up workloads for multiple tenants of a cloud computing system, includes the steps of determining a pool of workloads to be backed up during a time window, the workloads including workloads for a first tenant and workloads for a second tenant, placing a backup task for backing up each of the workloads in the pool in a scheduling queue and prioritizing the backup tasks according to backup parameters specified by the tenants, sizes of workload data to be backed up, and hardware constraints of a backup storage device executing the backups, and instructing the backup storage device to execute the backup tasks according to an order of the backup tasks in the scheduling queue.

18 Claims, 4 Drawing Sheets

(51) Int. Cl.
*G06F 11/14* (2006.01)
*G06F 9/48* (2006.01)
*G06F 9/455* (2018.01)
*G06F 16/11* (2019.01)
*G06F 9/46* (2006.01)
*G06F 16/182* (2019.01)

(52) U.S. Cl.
CPC .......... *G06F 9/4881* (2013.01); *G06F 9/5077* (2013.01); *G06F 11/1448* (2013.01); *G06F 11/1451* (2013.01); *G06F 11/1461* (2013.01); *G06F 11/1464* (2013.01); *G06F 16/113* (2019.01); *G06F 16/182* (2019.01); *G06F 2009/45562* (2013.01); *G06F 2009/45575* (2013.01); *G06F 2009/45583* (2013.01); *G06F 2009/45595* (2013.01); *G06F 2201/81* (2013.01); *G06F 2201/815* (2013.01); *G06F 2201/84* (2013.01)

(58) Field of Classification Search
CPC .......... G06F 2201/815; G06F 2201/84; G06F 2203/04103; G06F 2203/04105
See application file for complete search history.

(56) References Cited

U.S. PATENT DOCUMENTS

| | | | |
|---|---|---|---|
| 2004/0205206 A1* | 10/2004 | Naik | H04L 29/06 709/230 |
| 2012/0102088 A1 | 4/2012 | Bindal et al. | |
| 2012/0117029 A1 | 5/2012 | Gold | |
| 2013/0132561 A1* | 5/2013 | Pasala | H04L 67/1097 709/224 |
| 2013/0339390 A1 | 12/2013 | Muller et al. | |
| 2016/0373291 A1* | 12/2016 | Dornemann | H04L 67/28 |
| 2017/0126469 A1 | 5/2017 | Liang et al. | |
| 2018/0060176 A1 | 3/2018 | Thakkar et al. | |

* cited by examiner

EFFICIENT QUEUEING AND SCHEDULING OF BACKUPS IN A MULTI-TENANT CLOUD COMPUTING ENVIRONMENT

CROSS-REFERENCE TO RELATED APPLICATION(S)

This application claims the benefit of U.S. Provisional Patent Application No. 62/380,945, filed Aug. 29, 2016, the entire contents of which are incorporated by reference herein.

BACKGROUND

A cloud computing system of a cloud provider has a large number of hosts supporting many, perhaps thousands, of virtual machines (VMs) to meet the requirements of its cloud customers. The cloud provider performs various services for its cloud customers including data protection service (DPS). Parameters for the DPS, which include backup and recovery, are defined in service level agreements (SLAs) that cloud customers enter into with the cloud provider. Parameters are defined in terms of RTO (Recovery Time Objective) and RPO (Recovery Point Objective). When SLAs are violated, there are several consequences. First, customer confidence about deploying business critical workloads in the cloud is lowered. Second, cloud providers may have to pay penalties defined in the SLAs for violating the SLAs.

The cloud provider supports RPO and RTO SLAs in various ways. To support RPO SLAs, customers are allowed to select a scheduling window during which their production critical workloads should be backed up. The DPS performs backups for the customer workloads according to this scheduling window. To support RTO SLAs, customers are provided with self-service options to restore their workloads from any of the available backup images of the workloads. The DPS performs the data transfers for restoring the workload according to the options selected by the customers (tenants).

As the number of cloud customers scales up to hundreds, thousands, and more, the RPO and RTO SLAs may become difficult to satisfy consistently for all customers. One reason is that customers often schedule their backups during the same off-peak hours, e.g., 12:00 AM to 6:00 AM, and the expansion of hardware resources to meet the computational demands during such periods quickly becomes cost prohibitive and higher than the SLA violation costs.

SUMMARY

One or more embodiments provide techniques to efficiently queue and schedule backups in a multi-tenant cloud computing environment. A method of backing up workloads (e.g., virtual machines) for multiple tenants of a computing system, such as a cloud computing environment, includes determining a pool of workloads to be backed up during a time window, the workloads including workloads for a first tenant and workloads for a second tenant, placing a backup task for backing up each of the workloads in the pool in a scheduling queue and prioritizing the backup tasks according to backup parameters specified by the tenants, sizes of workload data to be backed up, and hardware constraints of a backup storage device executing the backups, and instructing the backup storage device to execute the backup tasks according to an order of the backup tasks in the scheduling queue.

Further embodiments include a non-transitory computer-readable storage medium that includes instructions for a processor to carry out the above method, and a computer system that includes a processor programmed to carry out the above method.

DETAILED DESCRIPTION

In the embodiments disclosed herein, a virtual machine is described as an example of a workload that is backed up. In general, a "workload" is some or all of the data specified in a tenant's SLA as requiring a backup. A workload may be a file, an object, a virtual machine, or a consistency group. An object is a group of files that must be backed up together as a single workload, such as for example, user mailboxes of an exchange server associated with a tenant. A consistency group is a group of virtual machines that must be backed up together as a single workload, such as for example, a group of virtual machines needed to execute a particular application.

Figure 1:
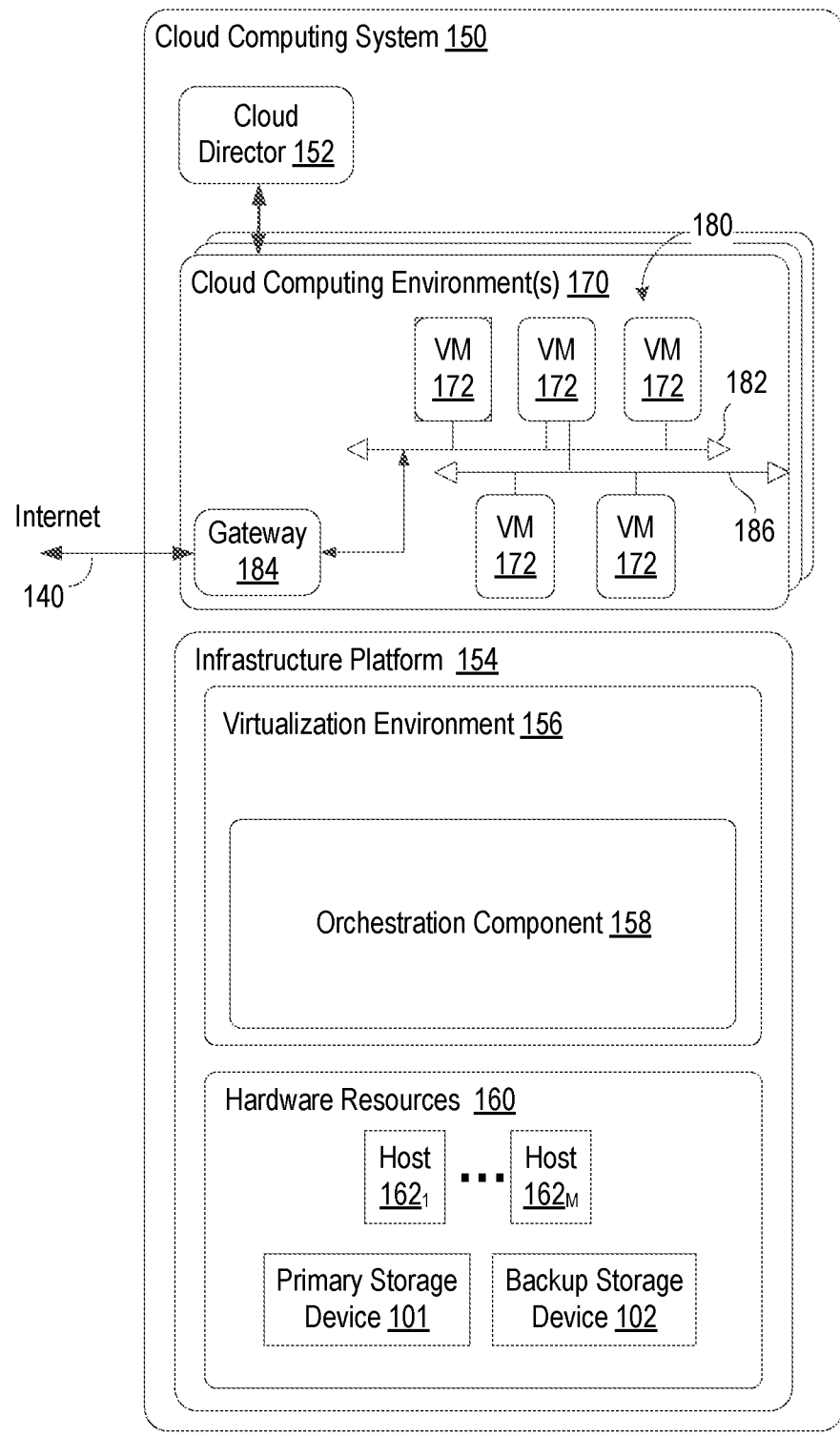
FIG. 1 is a block diagram of a cloud computing system in which embodiments may be practiced.

FIG. 1 is a block diagram of a cloud computing system 150 in which one or more embodiments may be utilized. Cloud computing system 150 is configured to dynamically provide an enterprise (or users of an enterprise) with one or more virtual data centers 170 in which a user may provision VMs 172, deploy multi-tier applications on VMs 172, and/or execute workloads. Cloud computing system 150 includes an infrastructure platform 154 upon which a cloud computing environment 170 may be executed.

In the particular embodiment of FIG. 1, infrastructure platform 154 includes hardware resources 160 having computing resources (e.g., hosts $162_1$ to $162_N$), storage resources including primary storage device 101 and backup storage device 102, and networking resources, which are configured in a manner to provide a virtualization environment 156 that supports the execution of a plurality of virtual machines 172 across hosts 162.

Each cloud computing environment 170 is associated with a particular tenant of cloud computing system 150. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired.

In one embodiment, cloud computing system 150 may include a cloud director 152 (e.g., running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing.

According to embodiments, orchestration component 158 triggers a backup to be performed by a data protection server according to the SLAs of the tenants. As part of the backup SLA, each tenant defines: (1) retention period (for how many days the backed up data must be retained); (2) time window in which backup will run automatically; and (3) recurrence policy (how frequently the backup should run: daily, weekly, or monthly). Violation of any of these policies would result in violation costs for the cloud provider.

Figure 2:
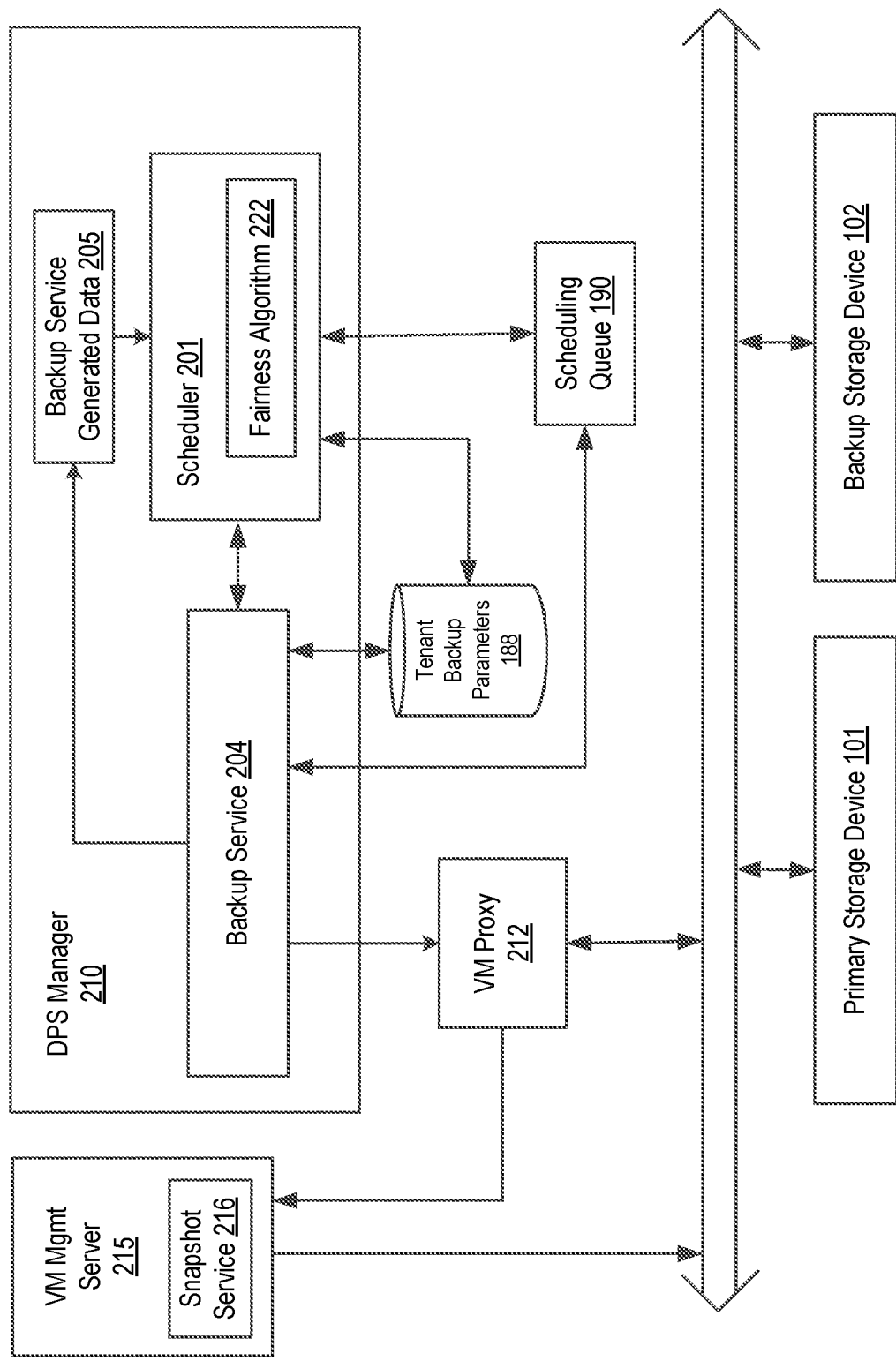
FIG. 2 is a schematic diagram that depicts a backup process for a plurality of VMs running in the cloud computer system.

FIG. 2 is a schematic diagram that depicts a backup process for a plurality of VMs running in the cloud computer center, when the backup is triggered by orchestration component 158. In one embodiment, the backup process depicted in FIG. 2 is carried out by a data protection service (DPS) manager 210 in conjunction with a VM management server 215, both of which are parts of orchestration component 158 of cloud computing system 150. DPS manager 210 includes a scheduler 201 that schedules backups of a tenant according to a fairness algorithm, which is further described below, which takes into account the tenant's backup parameters 188, such as SLA data, and backup service generated data 205, which is further described below. DPS manager 210 further includes a backup service 204 that coordinates backup operations with one or more backup agents running in hosts 162. In one embodiment, the backup agent is a VM running in hosts 162, and is referred to herein as a VM proxy.

Tenant's backup parameters 188 specify attributes of VMs that are to be backed up, such as frequency, time window for the backup, and the SLA, where a higher SLA means higher priority and higher costs for violating the SLA. Other attributes include history information such as the number of recent backup attempts, failures, and successes, and one or more of the following:
  (1) Application consistency group;
  (2) Mandate for daily backup;
  (3) Mandate for weekly offsite replicas;
  (4) Both (2) and (3); and
  (5) Backup within a time window of 2 am to 4 am, and if that fails, backup from 7 pm to 9 pm.

Figure 3:
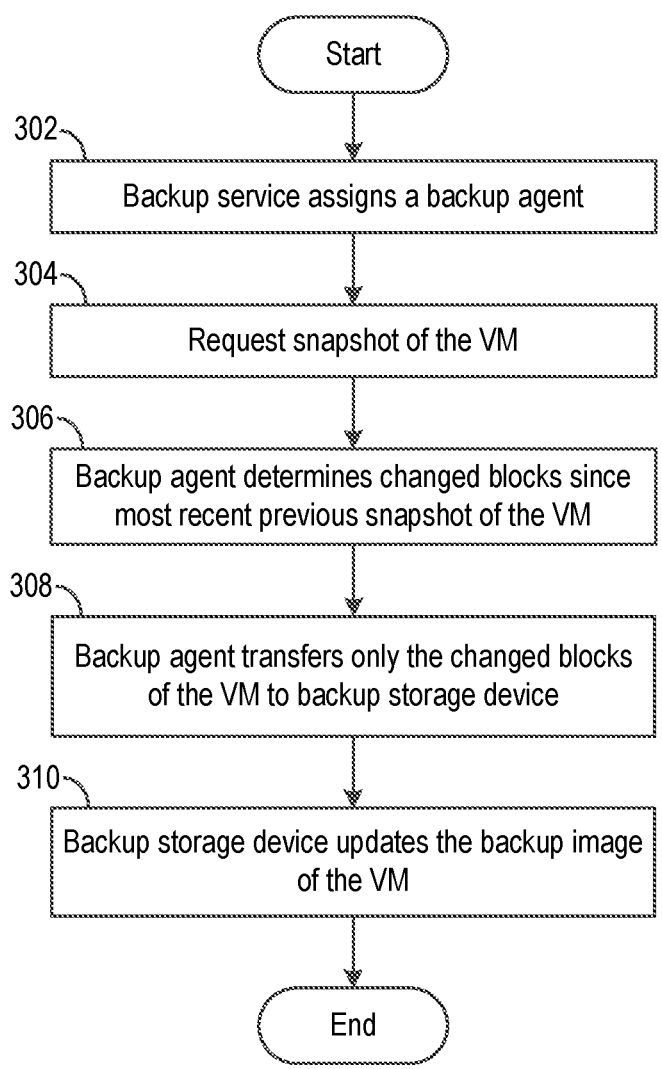
FIG. 3 is a flow diagram depicting a backup process for an individual VM according to an embodiment.

FIG. 3 depicts a backup process 300 for an individual VM according to an embodiment. To perform the backup, in step 302, backup service 204 assigns a backup agent (e.g., one of the virtual machines, VM proxy 212) for the VM to be backed up. In response, the backup agent communicates with a snapshot service 216 in VM management server 215 to take a backup snapshot of the VM. Snapshot service 216 takes the backup snapshot of the VM in step 304. Then, VM proxy 212 in step 306 determines data blocks of the VM that have changed since the most recent previous backup snapshot, and in step 308 updates the backup image of the VM in backup storage 102 with the changed blocks determined in step 306.

During the backup process, backup service 204 generates data (referred to herein as backup service generated data 205) which are used by scheduler 201 to place backups in scheduling queue 190. Backup service generated data 205 includes (a) a predicted total backup time for each VM needing backup during the next scheduling window, (b) a predicted SLA violation cost (cost metric) for each VM if not backed up, and (c) a number of system constraints, which reflect limitations in the data center. System constraints include the following:
  Maximum number of possible 10 connections supported by the backup server;
  Maximum IO read and write rates supported by the backup server;

Maximum IO reads of the primary storage;
Network bandwidth between the primary storage and the backup storage;
CPU cycles available on the backup server;
CPU cycles available on the hosts; and
Maximum threads supported by the backup agent.

It is desirable to maximize the number of VMs backed up and reduce or eliminate the service agreement violations without expanding the resources of cloud computing system 150, which requires additional infrastructure costs.

In a multi-tenant cloud computing system, different tenants that have enabled backups will have an associated RTO and RPO for their backups (and stored as part of tenant backup parameters 188) and it will be up to DPS manager 210 to perform the backups in accordance with the tenant RTOs and RPOs. In addition, the tenants may set a time window (e.g., 2 AM to 4 AM) and additional parameters (such as frequency, daily, weekly, monthly) for performing the backups, e.g., during off-peak hours. However, because one tenant sets its backup schedule and additional parameters without knowledge of backup schedules and additional parameters set by other tenants, the backup schedules and/or the additional parameters may conflict such that it might not be possible to satisfy all of the backup requirements of all tenants of the cloud computing system.

According to embodiments, a fairness algorithm implemented in scheduler 201 accounts for backup schedules and additional parameters set by all tenants who have enabled backups, and hard/physical resource and network constraints, to schedule the backups of multiple tenants. Consequently, multiple tenants may share the same physical storage array for storing backups, and the advantages offered by deduplication backup servers can be continued to be leveraged by the cloud computing system. As known in the art, "deduplication" is a process that allows efficient use of storage space. Typical computer file systems store file data in small, fixed-size blocks, referred to by pointers maintained in metadata associated with each file. In the event two pointers refer to identical blocks, some storage capacity can be reclaimed by changing one or both pointers so that they refer to the same block. The process of finding pointers that refer to identical blocks and then changing one or both pointers so that they point to the same block is known as "deduplication."

In one embodiment, the hardware constraints that the fairness algorithm takes into account include storage capacity of backup storage device 102, input/output operations per second (IOPS) of backup storage device 102, and concurrency of backup storage device 102 (which represents the rate data can be ingested by the backup server). Based on these constraints (and in some embodiments, other constraints including the system constraints listed above), the fairness algorithm determines whether to schedule a backup at the client specified time or not. In cases where a VM that is backed up goes down, the fairness algorithm gives priority to recovery or restoring of that VM over any scheduled backups.

FIG. 3 describes the use of snapshots to determine incremental changes to VMs and performs backups of only the changed blocks of the VMs. In another embodiment, backup service 204 does not rely on snapshot manager 215. Instead, backup service 204 quiesces IOs of the VM prior to backing up that VM and transmits the entire image of that VM to backup storage device 102 for storage therein. After receiving acknowledgment from backup storage device 102 that the entire image of the VM has been stored in backup storage device 102, backup service 204 resumes the IOs of the VM.

Figure 4:
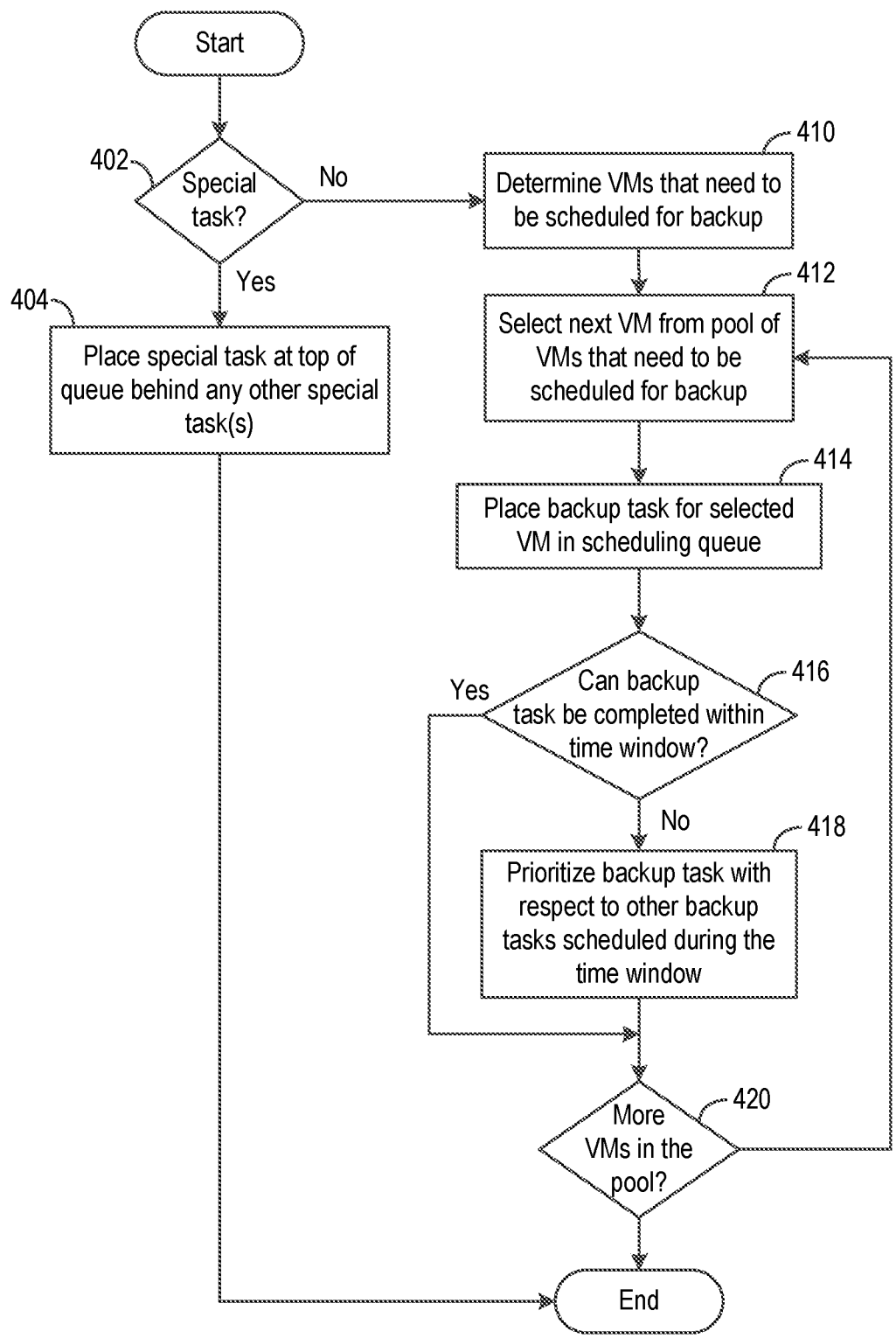
FIG. 4 is a flow diagram depicting a process for scheduling a task to be carried out by a backup storage device according to an embodiment.

FIG. 4 is a flow diagram that depicts a process for scheduling (by scheduler 201) a task to be carried out by backup storage device 102, according to an embodiment. The process is triggered by a request for a special task, such as recovery or restoring of a VM that went down or a backup demanded by a tenant to be carried out immediately. The process is also triggered periodically at the beginning of a time window for performing backups by backup storage device 102 so that scheduling queue 190 can be prepared for consumption by backup storage device 102 during the time window.

The process depicted in FIG. 4 begins in step 402, where scheduler 201 determines whether or not the task to be scheduled is a special task. Two types of special tasks are described herein. The first is a task to recover or restore a VM from a backup image of the VM stored by backup storage device 102. The second is a backup task that a tenant has demanded to be carried out immediately. In one embodiment, these on-demand backups are treated as tiered sales, requiring the tenant to pay a premium for such backups. If the task is determined to be a special task in step 402, scheduler 201 places the special task in scheduling queue 190 ahead of all non-special tasks, such a normal backup tasks, and behind other special tasks that scheduler 201 may have placed in scheduling queue 190 at an earlier time.

If the task is determined not to be special task in step 402, which means that the process is being triggered to prepare scheduling queue 190 for consumption by backup storage device 102, scheduler 201 in step 410 determines a pool of VMs that are to be backed up during the time window. For example, if the time window is from 2 AM to 4 AM, the process of FIG. 4 would be triggered at 2 AM. As described above, scheduler 201 obtains information about which VMs are to be backed up during the time window (e.g., 2 AM to 4 AM) from tenant backup parameters 188. In addition to the VMs that are designated in tenant backup parameters 188 to be backed up during the time window, there may be other VMs that have been added to the pool, e.g., VMs that were scheduled to be backed up during a prior time window but could not be backed up within that prior time window. For example, if a VM is scheduled to be backed up on a weekly basis, every Monday 2 AM to 4 AM, and the VM could not be backed up on a particular Monday 2 AM to 4 AM, the VM may be added to the pool of VMs being backed up on the following Tuesday 2 AM to 4 AM. Alternatively, such a VM may be added to the pool of VMs being backed up during the time window directly following Monday 2 AM to 4 AM, which would be Monday 4 AM to 6 AM. In addition, VMs in the pool may belong to different tenants. In one embodiment, some of the VMs in the pool belong to a first tenant, e.g., AAA Inc., and some of the VMs in the pool belong to a second tenant, BBB Corp.

After the pool of VMs to be backed up during the time window are identified in step 410, scheduler 201 executes steps 412, 414, 416, 418 (if needed), and 420 for each VM in the pool. Each of steps 412, 414, 416, 418, and 420 is further described below.

In step 412, scheduler 201 selects one of the VMs in the pool that has not yet been scheduled. Then, scheduler 201 places a backup task for backing up the selected VM in scheduling queue 190. The priority given to the backup task in the queue may be computed according to any technically feasible technique that takes into account one or more of the following attributes of the VM to be backed up: SLA, cost in violating the SLA, size of VM data to be updated, consistency group of the VM (because other VMs within the same consistency group will need to be backed up to provide a consistent backup state), and time of last backup.

In step 416, scheduler 201 evaluates, based on the system constraints contained in the backup service generated data 205 and the size of the VM data to be updated, whether the backup task being added can be completed on time. If so, scheduler 201 places the backup task in scheduling queue 190. If not, scheduler 201 performs a prioritization of the backup tasks in scheduling queue 190 including the backup task being added in step 418. Prioritization in this context means ordering of the backup tasks within scheduling queue 190 based on the priority given thereto. If the same priority is given to two or more backup tasks, the ordering is carried out in one embodiment according to a first-come, first-served model.

In step 420, scheduler 201 determines if backup task for all VMs in the pool have been scheduled. If not, the flow returns to step 412. If so, the process ends.

At the beginning of a time window, backup service 204 begins executing backup tasks that are ordered in scheduling queue 190, beginning from the head of the queue and then working its way down the queue towards the tail. Any backup tasks for VM not completed within the time window are disposed according to a policy of the tenant owning that VM, which is defined in tenant backup parameters 188. For example, tenant AAA Inc. may specify any such backup tasks to be scheduled again in the immediately following time window, whereas BBB Corp. specify any such backup tasks to be scheduled again the following day during the same time window.

Backup service 204 executes backup tasks in the manner described above in conjunction with FIG. 3. The number of concurrent backup tasks that backup service 204 executes depends on the hardware constraints of backup storage device 102.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of backing up workloads for multiple tenants of a computing system, comprising:
    determining a pool of workloads to be backed up during a first time window, the workloads including workloads for a first tenant and workloads for a second tenant;
    determining a predicted total backup time for each of the workloads based on a size of the workload data to be backed up and hardware constraints of a backup storage device executing the backups;
    placing a backup task for backing up each of the workloads in the pool in a scheduling queue and prioritizing the backup tasks according to backup parameters specified by the tenants, sizes of workload data to be backed up, the predicted total backup times, and the hardware constraints of the backup storage device, wherein the backup parameters include a second time window separate from the first time window, the second time window being an alternative if backup during the first time window fails; and instructing the backup storage device to execute the backup tasks according to an order of the backup tasks in the scheduling queue.

2. The method of claim 1, wherein the backup parameters include an SLA violation cost and a first backup task for backing up a first workload is scheduled ahead of a second backup task for backing up a second workload if the SLA violation cost for the first workload is higher than the SLA violation cost for the second workload.

3. The method of claim 1, wherein the size of the workload data to be backed up is less than a size of the entire workload.

4. The method of claim 1, further comprising:
responsive to a request for the backup storage device to execute a special task, placing the special task in the scheduling queue behind other special tasks and ahead of all other backup tasks.

5. The method of claim 4, wherein the special task, when executed by the backup storage device, restores a workload from a backup image of the workload.

6. The method of claim 4, wherein the special task is a backup task that is designated to be carried out immediately.

7. A non-transitory computer readable medium comprising instructions to be executed in a computer for managing backups of workloads for multiple tenants of a computing system, wherein the instructions when executed in the computer cause the computer to carry out the steps of:
determining a pool of workloads to be backed up during a first time window, the workloads including workloads for a first tenant and workloads for a second tenant;
determining a predicted total backup time for each of the workloads based on a size of the workload data to be backed up and hardware constraints of a backup storage device executing the backups;
placing a backup task for backing up each of the workloads in the pool in a scheduling queue and prioritizing the backup tasks according to backup parameters specified by the tenants, sizes of workload data to be backed up, the predicted total backup times, and the hardware constraints of the backup storage device, wherein the backup parameters include a second time window separate from the first time window, the second time window being an alternative if backup during the first time window fails; and
instructing the backup storage device to execute the backup tasks according to an order of the backup tasks in the scheduling queue.

8. The non-transitory computer readable medium of claim 7, wherein the backup parameters include an SLA violation cost and a first backup task for backing up a first workload is scheduled ahead of a second backup task for backing up a second workload if the SLA violation cost for the first workload is higher than the SLA violation cost for the second workload.

9. The non-transitory computer readable medium of claim 7, wherein the size of the workload data to be backed up is less than a size of the entire workload.

10. The non-transitory computer readable medium of claim 7, wherein the steps carried out by the computer further include:
responsive to a request for the backup storage device to execute a special task, placing the special task in the scheduling queue behind other special tasks and ahead of all other backup tasks.

11. The non-transitory computer readable medium of claim 10, wherein the special task, when executed by the backup storage device, restores a workload from a backup image of the workload.

12. The non-transitory computer readable medium of claim 10, wherein the special task is a backup task that is designated to be carried out immediately.

13. A computing system comprising:
a plurality of computers in each of which virtual machines are running, the virtual machines including virtual machines for a first tenant and virtual machines for a second tenant; and
a backup storage device configured to store backup images of the virtual machines for both the first tenant and the second tenant, wherein
one of the computers has running therein a data protection service that performs the steps of:
determining a pool of virtual machines to be backed up during a first time window, the pool of virtual machines including virtual machines for the first tenant and virtual machines for the second tenant;
determining a predicted total backup time for each of the virtual machines in the pool based on a size of the virtual machine data to be backed up and hardware constraints of a backup storage device executing the backups;
placing a backup task for backing up each of the virtual machines in the pool in a scheduling queue and prioritizing the backup tasks according to backup parameters specified by the tenants, sizes of virtual machine data to be backed up, the predicted total backup times, and the hardware constraints of the backup storage device, wherein the backup parameters include a second time window separate from the first time window, the second time window being an alternative if backup during the first time window fails; and
instructing the backup storage device to execute the backup tasks according to an order of the backup tasks in the scheduling queue.

14. The computing system of claim 13, wherein the backup storage device is configured to perform deduplication of all data stored thereby, including virtual machine data of the first tenant and virtual machine data of the second tenant.

15. The computing system of claim 13, wherein the data protection service runs in one the virtual machines.

16. The computing system of claim 13, wherein one of the virtual machines operates as a backup agent for preparing virtual machine data to be backed up.

17. The computing system of claim 16, wherein the size of the virtual machine data to be backed up is less than a size of the entire virtual machine.

18. The computing system of claim 13, wherein the steps performed by the data protection service include:
responsive to a request for the backup storage device to execute a special task, placing the special task in the scheduling queue behind other special tasks and ahead of all other backup tasks.

* * * * *